Sept. 30, 1958 J. E. FERNEKEES 2,854,573

ELECTRONIC STORAGE DEVICE EMPLOYING A PHANTASTRON
WITH ARRANGEMENT FOR GATING SYNCHRONIZING PULSES

Filed May 28, 1954

INVENTOR.
JAMES E. FERNEKEES

BY Albert R. Hodges

ATTORNEY

United States Patent Office 2,854,573

Patented Sept. 30, 1958

2,854,573

ELECTRONIC STORAGE DEVICE EMPLOYING A PHANTASTRON WITH ARRANGEMENT FOR GATING SYNCHRONIZING PULSES

James E. Fernekees, Wappingers Falls, N. Y., assignor to International Business Machines Corporation, New York, N. Y., a corporation of New York Application May 28, 1954, Serial No. 433,238

5 Claims. (Cl. 250—27)

Figure 1:
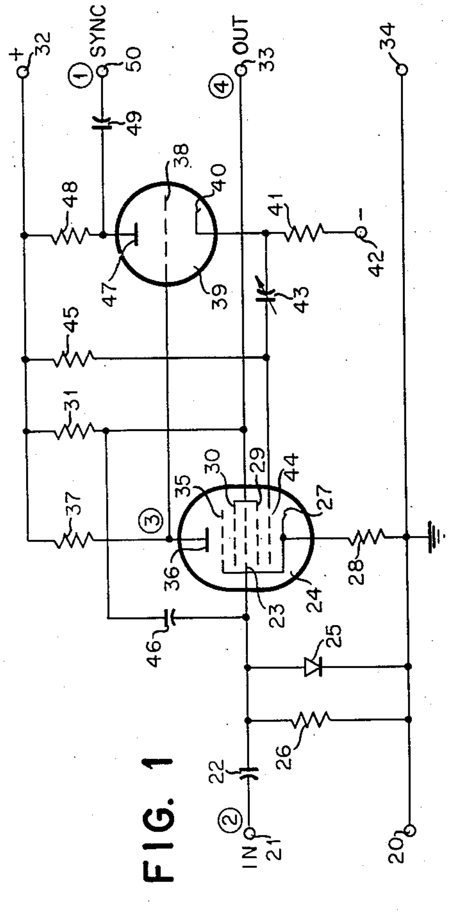

The present invention relates to an electronic storage device and more particularly to a regenerative dynamic storage device adapted for storing for a definite period of time, or any positive integral multiple of this period, data represented by an electrical pulse.

Accordingly, the storage device of the present invention is especially suited for use in systems in which the numerical value of a digit is represented by the time position of a pulse, and in which it is desired to store and then make available the value of this digit in a subsequent operating period of the system.

The principal object of the present invention is the provision of a new, more stable, and less complex electronic storage device.

Another object of the present invention is the provision of an electronic storage device utilizing a trigger circuit of the controlled free-running relaxation oscillator type.

A further object of the present invention is the provision of an electronic storage device utilizing a trigger circuit of the phantastron type.

In accordance with the present invention there is provided a storage device for electrical pulses which comprises a source of uniformly spaced synchronizing pulses, a trigger circuit adapted to be initially triggered by an input pulse and to provide an output pulse at the end of each successive operating cycle thereof, and means for insuring that each operating cycle corresponds in duration to a predetermined number of the synchronizing pulses. The input triggering pulse preferably substantially coincides with one of the synchronizing pulses. The trigger circuit is preferably of the controlled free-running relaxation oscillator type and, in a preferred embodiment of the invention, comprises a trigger circuit of the phantastron type. The design and operation of phantastron circuits "per se" is well known to those skilled in the art. In this regard reference may be made to one or more of the following publications:

"Principles of Radar" by the M. I. T. Radar School Staff, second edition, published by McGraw-Hill Book Company, Inc., pages 2–58 through 2–59, copyright 1946; "Electron-Tube Circuits" by S. Seely, published by McGraw-Hill Book Company, Inc., page 431 through page 434, copyright 1950; "Recurrent Electrical Transients" by L. W. Von Tersch and A. W. Swago, published by Prentice-Hall, Inc., pages 374 through 378, copyright 1953; Massachusetts Institute of Technology, Radiation Laboratory series, volume 19 entitled "Waveforms," pages 195 through 204, 287, 288, 488, 489, 577 through 582 and 624, copyright 1949, published by McGraw-Hill Book Company, Inc.; United States Patent No. 2,549,874, granted April 24, 1951; "Ranging Circuits, Linear Time-Base Generators, and Associated Circuits," by F. C. Williams and N. F. Moody, Proceedings of Institution of Electrical Engineers, volume 93, part 3a, pages 1188 through 1198; "Design of Phantastron Time Delay Circuits," by R. N. Close and M. T. Lebenbaum, Electronics, April 1948, pages 100 through 107.

Other objects and features of the invention will be pointed out in the following description and claims and illustrated in the accompanying drawing, which disclose by way of example the principle of the invention and the best mode, which has been contemplated, of applying that principle.

Figure 2:
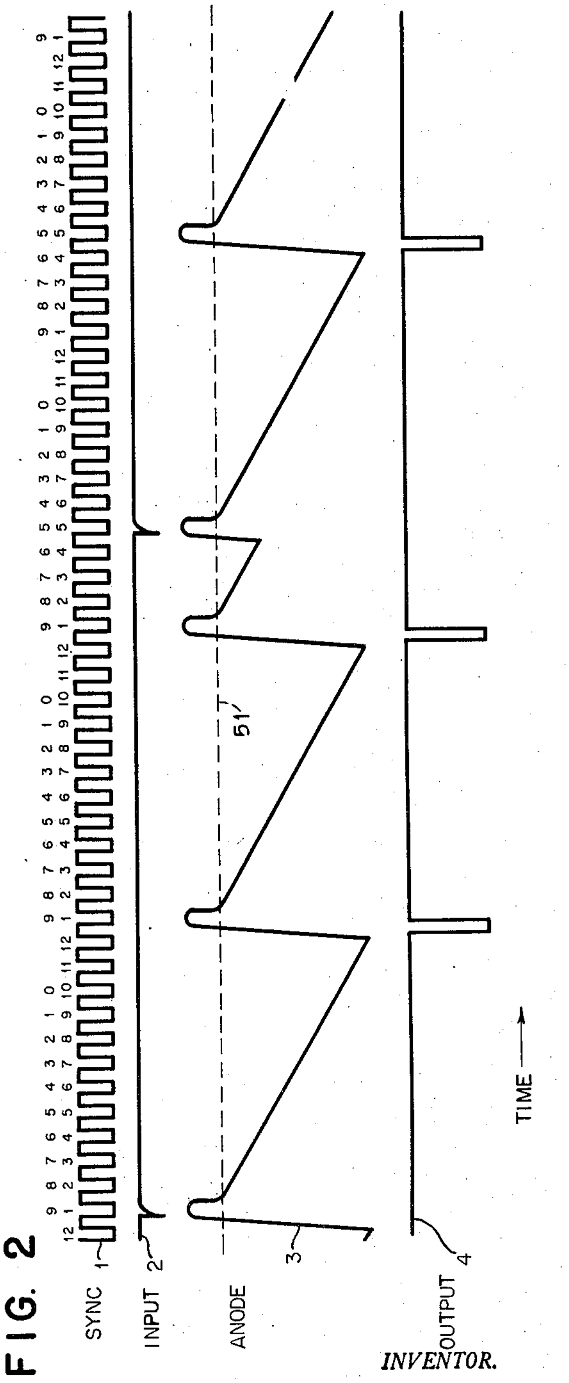

In the drawing:

Fig. 1 is a schematic circuit diagram of an electronic storage device in accordance with a preferred embodiment of the present invention; and Fig. 2 is a graphical representation, to a common time base, of the approximate waveforms which exist in various portions of the system of Fig. 1, these portions being designated by the encircled reference numerals.

Referring to Fig. 1 of the drawing, there is shown an electronic storage device in accordance with the present invention and comprising essentially a trigger circuit of the phantastron type together with associated apparatus for triggering the phantastron at a desired instant and for insuring that it operates at a predetermined rate.

A pair of input terminals 20 and 21 are provided, input terminal 20 preferably being grounded and input terminal 21 being coupled by a capacitor 22 to the third grid 23 of a vacuum tube 24, preferably of the pentagrid converter type. A clamping circuit comprising a rectifier 25 and a resistor 26 is connected between grid 23 and ground.

Cathode 27 of tube 24 is grounded through a resistor 28. Second and fourth grids 29 and 30 are connected together internally and through a resistor 31 to a source 32 of positive potential. Grids 29 and 30 are also connected to a first output terminal 33, the second output terminal 34 preferably being grounded as shown.

The fifth grid 35 of tube 24 is connected internally to cathode 27. Anode 36 of tube 24 is connected through a resistor 37 to positive potential source 32, and is also connected to grid 38 of a vacuum tube 39, preferably of the triode type. Cathode 40 of tube 39 is connected through a resistor 41 to a source 42 of negative potential. Cathode 40 is coupled by means of a capacitor 43, preferably adjustable as shown, to first grid 44 of tube 24. A resistor 45 is connected between grid 44 and positive potential source 32. A capacitor 46 is connected between grid 23 and joined grids 29 and 30 of tube 24.

Anode 47 of tube 39 is connected to positive potential source 32 through a resistor 48, and is coupled by a capacitor 49 to a terminal 50, to which are applied uniformly spaced synchronizing pulses, represented by curve 1 of Fig. 2, from any suitable external source, not shown.

The waveform of the negative-going input or triggering pulses which are applied to input terminal 21 is represented by curve 2 of Fig. 2. The approximate waveform developed at anode 36 of tube 24 is illustrated by curve 3 of Fig. 2. The output pulses developed at output terminal 33 are depicted by curve 4 of Fig. 2.

In operation, let it first be assumed that the digit value "nine" is to be stored. Accordingly, an input pulse occurring at "nine" time and represented by the first pulse of curve 2 is applied to input terminal 21. This negative-going pulse on grid 23 lowers the conductivity of tube 24, so that the potential of anode 36 rapidly rises. Due to the action of the phantastron circuit, however, the potential of anode 36 soon begins to fall again as tube 24 becomes increasingly conductive. This decrease continues for a time interval determined by the constants of the circuit. In the illustrated embodiment, the operating cycle of the phantastron circuit is chosen to be approximately twelve times the period of the synchronizing pulses illustrated by curve 1. It will be understood that other ratios may be employed equally well. At "nine" time in the next operating period of the device, a first output pulse is produced due to the decrease of the potential on grids 29 and 30. Likewise at "nine" time in the third operating period, a second output pulse is produced.

Now let it be assumed that it is desired to change the value stored from a "nine" to a "five." In this case, an input pulse occurring at "five" time is utilized to trigger the phantastron circuit, as illustrated by the second negative-going pulse of curve 2. As shown by curve 3, the phantastron circuit is caused to interrupt its previously started operating cycle and to start over again at "five" time. Upon the completion of this new operating cycle, an output pulse is produced at "five" time, as illustrated by the third pulse of curve 4. In successive operating periods, an output pulse would continue to be developed at "five" time, just as was the case when a "nine" had been stored. It will be apparent, therefore, that the number stored in the device may be changed at will without the necessity of resetting the device to zero. This is an important feature of the present invention.

In accordance with another important feature of the present invention, means for insuring that each operating cycle of the phantastron circuit corresponds in duration to a predetermined number of synchronizing pulses are provided. As previously mentioned, the synchronizing pulses of curve 1 are applied through terminal 50 and capacitor 49 to anode 47 of tube 39. This tube, which operates as a cathode follower for the purpose of improving the waveform of the phantastron circuit in a manner previously well known, is also utilized as a gated diode to permit only a particular synchronizing pulse to be applied to the phantastron circuit in each operating period. Since tube 39 is nonconductive except when anode 36 of tube 24 is above a critical value represented by broken line 51 associated with curve 3, due to the connection between anode 36 and grid 38, synchronizing pulses applied to terminal 50 are without effect in all regions other than that in which anode 36 is above this critical value. As will be seen from curve 3, this condition is met during only a very small portion of each operating cycle of the phantastron circuit. This portion is wide enough to coincide, wholly or partially, with only a single synchronizing pulse at a time. It will be apparent, therefore, that only a selected synchronizing pulse in each cycle will be permitted to pass through tube 39 and be applied through capacitor 43 to grid 44 of tube 24 for the purpose of controlling and precisely establishing at exactly the desired time interval the operating cycle of the phantastron circuit, which by suitable choice of constants already has a cycle closely approaching the predetermined desired multiple of the synchronizing pulse period. Thus tube 39 also serves as a gating means to insure proper synchronization of the phantastron circuit, so that a total of only two tubes is necessary for each storage device in accordance with the present invention.

In one particular embodiment of the present invention which was specifically designed for operation in, and which operated successfully in, a system employing an operating cycle of 240 microseconds and a synchronizing pulse rate of 50 kilocycles per second, the following values of constants and components were utilized:

| | | |
|---|---|---|
| Resistor **26** | ohms | 47,000 |
| Resistor **28** | do | 680 |
| Resistor **31** | do | 6,800 |
| Resistor **37** | do | 150,000 |
| Resistor **41** | do | 200,000 |
| Resistor **45** | megohms | 7.5 |
| Resistor **48** | ohms | 4,700 |
| Capacitors **22**, **46** and **49** | micromicrofarads | 47 |
| Adjustable capacitor **43** | do | 8–50 |
| Rectifier **25** | | Type 1N48 |
| Tube **24** | | Type 6BE6 |
| Tube **39** | | ½ Type 12AT7 |
| Potential source **32** | volts | +150 |
| Potential source **42** | do | −100 |

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A storage device for electrical pulses comprising: a source of uniformly spaced synchronizing pulses; a trigger circuit of the controlled free-running relaxation oscillator type having first and second control terminals and being adapted to be initially triggered by an input pulse applied to said first control terminal and to provide an output pulse at the end of each successive operating cycle thereof; and means for stabilizing the operation of said trigger circuit and for insuring that each said operating cycle corresponds in duration to a predetermined number of said synchronizing pulses, said means comprising a single electron discharge device serving simultaneously as a cathode follower to stabilize said trigger circuit and as a gate connected between said source of synchronizing pulses and said second control terminal.

2. A storage device for electrical pulses comprising: a source of uniformly spaced synchronizing pulses; a trigger circuit of the phantastron type having first and second control terminals and being adapted to be initially triggered by an input pulse substantially coinciding with one of said synchronizing pulses applied to said first control terminal and to provide an output pulse at the end of each successive operating cycle thereof; and means for stabilizing the operation of said trigger circuit and for insuring that each said operating cycle corresponds in duration to a predetermined number of said synchronizing pulses, said means comprising a single electron discharge device having plural load impedances and serving simultaneously as a cathode follower to stabilize said trigger circuit and as a gate connected between said source of synchronizing pulses and said second control terminal.

3. A storage device for electrical pulses comprising: a source of uniformly spaced synchronizing pulses; a trigger circuit of the phantastron type having first and second control terminals and being adapted to be initially triggered by an input pulse applied to said first control terminal and to provide an output pulse at the end of each successive operating cycle thereof; and means for stabilizing the operation of said trigger circuit and for insuring that each said operating cycle corresponds in duration to a predetermined number of said synchronizing pulses, said means comprising a single electron discharge device having an anode and a cathode and serving simultaneously as a cathode follower to stabilize said trigger circuit and as a gated diode, said source of synchronizing pulses being coupled to said anode and said second control terminal being coupled to said cathode whereby only selected ones of said synchronizing pulses are permitted to control said trigger circuit.

4. A storage device for electrical pulses comprising: a source of uniformly spaced synchronizing pulses; a trigger circuit of the phantastron type comprising a first electron discharge device having a first anode and first and second control electrodes; means for initially triggering said trigger circuit comprising a coupling adapted to apply an input pulse to said first control electrode so as to provide an output pulse at the end of each successive operating cycle of said trigger circuit; and means for stabilizing the operation of said trigger circuit and for insuring that each said operating cycle corresponds in duration to a predetermined number of said synchronizing pulses, said means comprising a second electron discharge device having a second anode, a grid and a cathode, said source of synchronizing pulses being coupled to said second anode and said second control electrode being coupled to said cathode, and a connection between said first anode and said grid, whereby said second electron discharge device serves simultaneously as a cathode follower to stabilize said trigger circuit and as a gated diode which is conductive only long enough in each said operating cycle to permit a selected one of said synchronizing pulses to control said trigger circuit.

5. A storage device for electrical pulses comprising: a source of uniformly spaced synchronizing pulses; a trigger circuit of the phantastron type comprising a first electron discharge device having a first anode and first and second control electrodes; means for initially triggering said trigger circuit comprising a coupling adapted to apply an input pulse to said first control electrode so as to provide an output pulse at the end of each successive operating cycle of said trigger circuit; and means for stabilizing the operation of said trigger circuit and for insuring that each said operating cycle corresponds in duration to a predetermined number of said synchronizing pulses, said means comprising a second electron discharge device having a second anode, a grid and a cathode, load resistors associated respectively with said second anode and said cathode, said source of synchronizing pulses being coupled to said second anode and said second control electrode being coupled to said cathode, and a connection between said first anode and said grid, whereby said second electron discharge device serves simultaneously as a cathode follower to stabilize said trigger circuit and as a gated diode which is conductive only long enough in each said operating cycle to permit a selected one of said synchronizing pulses to control said trigger circuit.

References Cited in the file of this patent

UNITED STATES PATENTS

| | | |
|---|---|---|
| 2,487,822 | McLamore et al. | Nov. 15, 1949 |
| 2,580,740 | Dickinson | Jan. 1, 1952 |
| 2,642,532 | Mofenson | June 16, 1953 |
| 2,724,826 | Leachman | Nov. 22, 1955 |

OTHER REFERENCES

"Waveforms," Radiation Laboratory Series, vol. 19, page 199.

"Electronic," May 1946, pp. 142–143.